US006701137B1

(12) United States Patent
Judd et al.

(10) Patent No.: US 6,701,137 B1
(45) Date of Patent: Mar. 2, 2004

(54) ANTENNA SYSTEM ARCHITECTURE

(75) Inventors: Mano D. Judd, Rockwall, TX (US); Gregory A. Maca, Rockwall, TX (US); Donald G. Jackson, Richardson, TX (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 09/538,955

(22) Filed: Mar. 31, 2000

Related U.S. Application Data

(63) Continuation-in-part of application No. 09/299,850, filed on Apr. 26, 1999, now Pat. No. 6,583,763, which is a continuation-in-part of application No. 09/422,418, filed on Oct. 21, 1999, now Pat. No. 6,597,325.

(51) Int. Cl.[7] .......... H04B 15/00
(52) U.S. Cl. .......... 455/121; 455/62
(58) Field of Search .......... 343/890, 878, 343/700 MS; 455/62, 524, 53.1, 33.1

(56) References Cited

U.S. PATENT DOCUMENTS

| | | | | |
|---|---|---|---|---|
| 4,124,852 A | | 11/1978 | Steudel | 343/854 |
| 4,246,585 A | | 1/1981 | Mailloux | 343/854 |
| 4,360,813 A | | 11/1982 | Fitzsimmons | 343/100 |
| 4,566,013 A | | 1/1986 | Steinberg et al. | 343/372 |
| 4,689,631 A | | 8/1987 | Gans et al. | 343/781 |
| 4,825,172 A | | 4/1989 | Thompson | 330/124 R |
| 4,849,763 A | | 7/1989 | DuFort | 342/372 |
| 4,890,110 A | | 12/1989 | Kuwahara | 342/35 |
| 4,994,813 A | | 2/1991 | Shiramatsu et al. | 342/360 |
| 5,034,752 A | | 7/1991 | Pouraily et al. | 342/373 |
| 5,230,080 A | | 7/1993 | Fabre et al. | 455/15 |
| 5,248,980 A | | 9/1993 | Raguenet | 342/354 |
| 5,280,297 A | | 1/1994 | Profera, Jr. | 343/754 |
| 5,327,150 A | | 7/1994 | Cherrette | 373/771 |
| 5,379,455 A | | 1/1995 | Koschek | 455/273 |
| 5,412,414 A | | 5/1995 | Ast et al. | 342/174 |
| 5,457,557 A | * | 10/1995 | Zarem et al. | 359/121 |
| 5,513,176 A | | 4/1996 | Dean et al. | 370/18 |
| 5,548,813 A | | 8/1996 | Charas et al. | 455/33.3 |
| 5,554,865 A | * | 9/1996 | Larson | 257/275 |
| 5,596,329 A | | 1/1997 | Searle et al. | 342/374 |
| 5,603,089 A | * | 2/1997 | Searle et al. | 455/53.1 |
| 5,604,462 A | | 2/1997 | Gans et al. | 330/124 R |
| 5,619,210 A | | 4/1997 | Dent | 342/352 |
| 5,644,622 A | | 7/1997 | Russell et al. | 455/422 |
| 5,646,631 A | | 7/1997 | Arntz | 342/373 |
| 5,659,322 A | | 8/1997 | Caille | 342/188 |
| 5,710,804 A | | 1/1998 | Bhame et al. | 379/58 |
| 5,714,957 A | | 2/1998 | Searle et al. | 342/374 |

(List continued on next page.)

FOREIGN PATENT DOCUMENTS

| | | | |
|---|---|---|---|
| GB | 2286749 A | 8/1996 | H04B/7/08 |
| WO | WO95/26116 | 9/1995 | H04Q/7/36 |
| WO | WO95/34102 | 12/1995 | H01Q/1/38 |
| WO | WO98/09372 | 3/1998 | H03F/1/32 |
| WO | WO 98/11626 | 3/1998 | H01Q/23/00 |
| WO | WO98/11626 | 3/1998 | H01Q/23/00 |
| WO | WO98/50981 | 11/1998 | H01Q/3/40 |

*Primary Examiner*—James Clinger
(74) *Attorney, Agent, or Firm*—Wood, Herron & Evans, LLP

(57) ABSTRACT

An antenna system for tower-top installation includes an antenna array of M×N antenna elements, a corporate feed for operatively interconnecting said antenna elements, a backhaul channel for communicating with ground-based equipment, and radio frequency circuits for processing radio frequency signals between the antenna array and a backhaul link. The radio frequency circuits include substantially all of the circuits required for the processing of radio frequency signals between the antenna array and the backhaul link.

42 Claims, 13 Drawing Sheets

U.S. PATENT DOCUMENTS 5,724,666 A 3/1998 Dent .......................... 455/562
5,751,250 A 5/1998 Arntz ......................... 342/373
5,758,287 A 5/1998 Lee et al. ................... 455/450
5,770,970 A 6/1998 Ikeda et al. ................. 330/286
5,802,173 A 9/1998 Hamilton-Piercy et al. ......................... 379/56.2
5,809,395 A 9/1998 Hamilton-Piercy et al. .. 455/4.1
5,832,389 A 11/1998 Dent .......................... 455/562
5,854,611 A 12/1998 Gans et al. ................. 342/373
5,862,459 A 1/1999 Charas ....................... 455/114
5,878,345 A * 3/1999 Ray et al. ................... 455/431
6,006,069 A * 12/1999 Langston ..................... 455/62
6,043,790 A 3/2000 Derneryd et al. ........... 343/853
6,091,360 A 7/2000 Reits .......................... 342/368
6,104,935 A 8/2000 Smith et al. ................ 455/562
6,140,976 A 10/2000 Locke et al. ................ 343/853
6,198,460 B1 3/2001 Brankovic .................. 343/879
6,222,503 B1 4/2001 Gietema et al. ............ 343/890

* cited by examiner

ANTENNA SYSTEM ARCHITECTURE

CROSS-REFERENCE TO RELATED APPLICATION

This application is a continuation-in-part of pending application Ser. No. 09/299,850, filed Apr. 26, 1999, now U.S. Pat. No. 6,583,763 and application Ser. No. 09/422,418, filed Oct. 21, 1999, now U.S. Pat. No. 6,597,325.

BACKGROUND OF THE INVENTION

Steered beam antenna systems have been used in defense electronics for radar systems, or for direction finding (DF) applications. These technologies have been making their way into commercial communications, for interference reduction and/or capacity enhancement. The generally accepted term in the latter industry is smart antennas; however, the term has been used to describe many different techniques and technologies. The earlier technologies were based on RF (radio frequency) beam steering, which used selection of one of a number of highly directional antennas. In these technologies, tower top antennas were typically completely passive, with the beams formed via Butler matrices, or by selecting antennas individually. The independent beam signals were then delivered to the base station via separate coaxial RF lines, with signal selection and RF switching performed at the base station.

Digitally adaptive systems, which might use any type of antennas at the tower top, and digital signal processing techniques (DSP) at the base station, have been tested and are slowly making their way into the commercial markets. However, most of these technologies are still based on using passive antennas at the tower top, bringing the RF signals from the tower to the base station via coaxial (RF) cables. The frequency conversion, digital conversion, and beamformer processing is then performed at the base station.

OBJECTS AND SUMMARY OF THE INVENTION

In accordance with one aspect of the invention, an antenna system architecture is based on installing the RF electronics at the tower top, with the antenna or within the antenna housing. Other aspects of the antenna system architecture of the invention include:

- Tower top electronics;
- Distributed amplifier system;
- Frequency and digital conversion at the tower top;
- Antenna/array inputs/outputs are time division multiplexed;
- Final multiplexed digital signal is converted to fiber optics;
- Single or multiple fiber optic delivery cables for backhaul, or convert to microwave for backhaul.

Additionally, this approach allows for a basic split of functionalities, as follows:

- RF signal processing is performed at the tower top;
- Beamforming (DSP) and channel coding is performed at another location, such as:
  - a) at the bottom of the tower (base station) or BTS (Base Transceiver System);
  - b) at the MSC (Mobile Switching Center); or
  - c) at the CO (Central Switching Office).

This approach allows all processing and software, as well as digital hardware, to be installed at a single location, rather than distributed among various cell sites; which should reduce initial installation costs, as well as maintenance and upgrade costs.

Briefly, in accordance with the foregoing, an antenna system, for tower-top installation, comprises an antenna array comprising an array of M×N antenna elements, a corporate feed for operatively interconnecting said antenna elements with a backhaul link for communicating with ground-based equipment, and radio frequency circuits for processing radio frequency signals between said antenna array and said backhaul link, said radio frequency circuits including substantially all of the circuits required for the processing of radio frequencing signals between said array and said backhaul link.

DETAILED DESCRIPTION OF THE ILLUSTRATED EMBODIMENT

Figure 1:
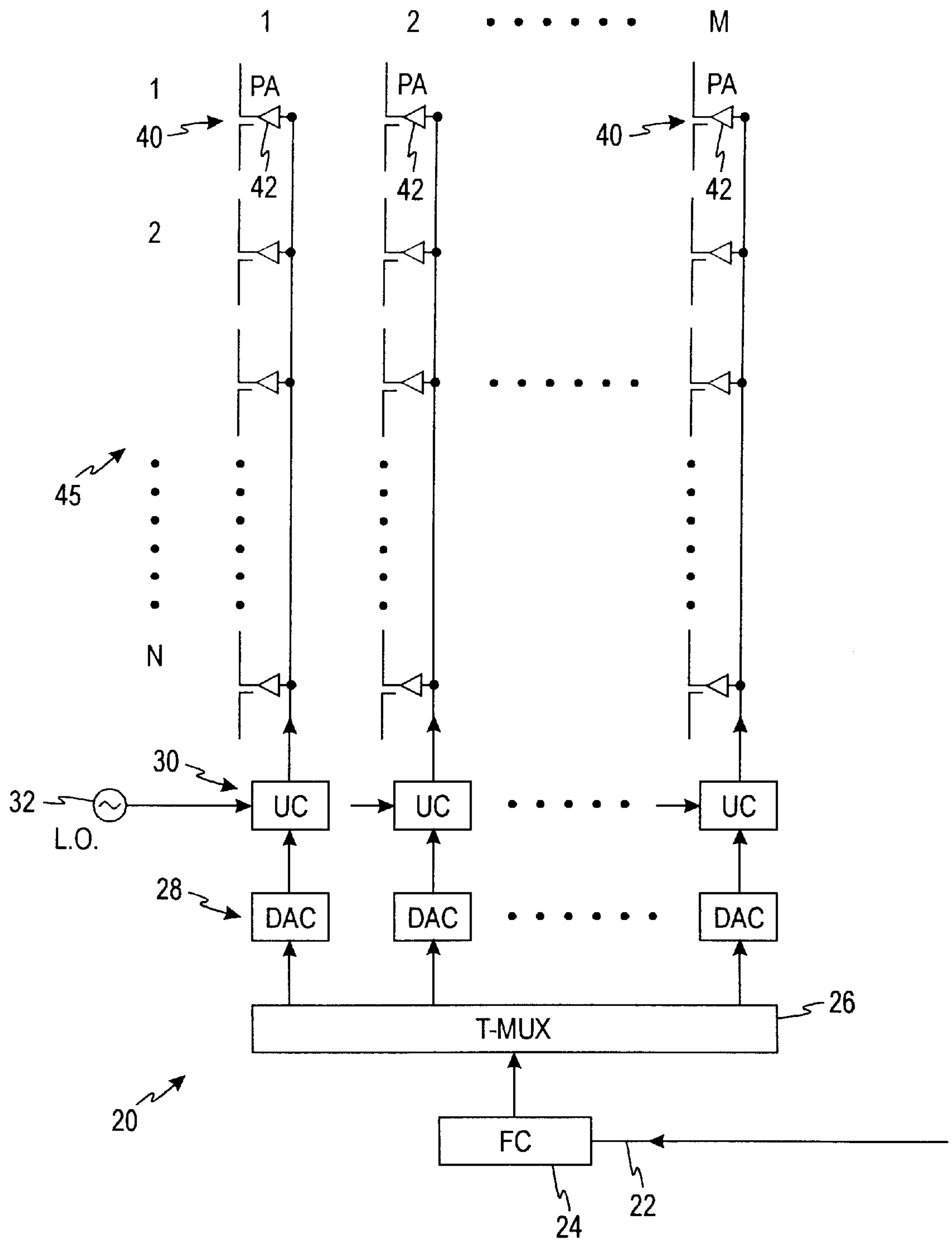
FIG. 1 is a simplified schematic diagram, partially in block form, of a transmit only configuration for a generalized beamformer/smart antenna system; having tower top mounted electronics.

Referring now to the drawings, FIG. 1 shows a transmitter system configuration 20 for a beamformer/smart antenna system, using tower-top mounted electronics for all of the RF circuits. The illustrated embodiment takes digital IF (intermediate frequency) signals (from an optical carrier or fiber optic cable 22), converts, at a fiber converter (FC) 24 from optical to a high speed digital signal and at a high speed time multiplexer (T-MUX) 26 de-multiplexes the high speed digital signal into M lower speed digital signals. The transmitter 20 next converts to analog via digital to analog converters (DAC) 28 and upconverts, at upconverters (UC) 30, the analog IF signals to RF. The transmitter 20 then amplifies the signals via a distributed antenna approach, resulting in a beamformed collection of signals. This distributed antenna approach, in the embodiment illustrated in FIG. 1, comprises an M by N array of antenna elements 40, such as patch/microstrip antenna elements, and a power amplifier (PA) 42 closely coupled to each of the antenna elements 40, for example, at the feedpoint of each antenna element 40. Thus, each of the upconverters 30 feeds one of M composite antennas, each comprising a total of N antenna elements.

In operation, after conversion from fiber (optical IF) to digital, at a selected data rate X, the high speed digital signal is de-multiplexed into M streams of digital signals, at data rates of X/M. These signals contain the digital beamforming weights and adjustments for phase and amplitude (determined and fixed at a central processing site-BTS, MSC, or CO). It will be noted that digital IF signals may be fed to/from the T-MUX by a twisted pair or coaxial cable rather than using a fiber optic cable and converter as shown in FIG. 1 and the below-described drawings. Also, a DC power cable/system for delivering DC power from the ground to the tower top has been omitted in the drawings for simplicity, but will be understood to be included in such systems.

The diagram of FIG. 1 shows M columns of N antenna elements forming an antenna array 45, each connected via a series corporate feed network. Parallel corporate feed arrangements could also be used here and throughout the rest of the described embodiments hereinbelow. The corporate feed network could be microstrip, stripline, or RF coaxial cables.

Each antenna element 40 is fed with a power amplifier (PA) module 42, in similar fashion to the active/distributed antenna architecture described in the above-referenced copending applications.

A common local oscillator (LO) 32 is used for all of the upconverters 30, thus assuring coherent phase for each of the M paths. This LO 32 can be a fixed frequency crystal, or a synthesizer.

The fiber optic input(s) 22 to the fiber to digital converter (FC) 24 can be separate lines (e.g., multi-mode fiber), or a single line (e.g., single mode fiber).

Figure 2:
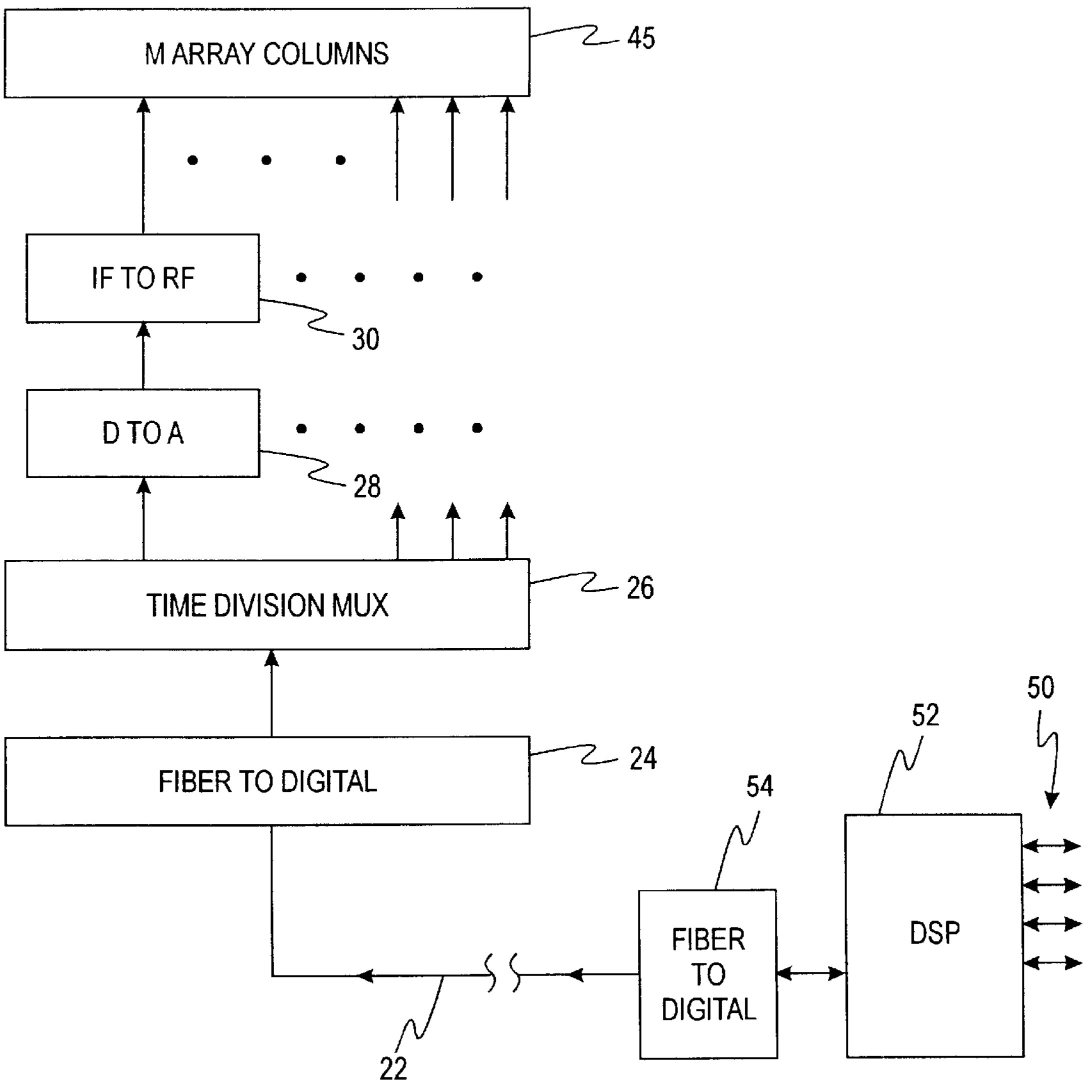
FIG. 2 is a functional block diagram of the components in FIG. 1, and corresponding base station mounted components.

FIG. 2 shows the tower-top components of FIG. 1 in functional block form (shown on the left hand side of FIG. 2), and (on the right side of FIG. 2) a ground-based central processing site (BTS, MSC or CO). In FIG. 2, voice and or data channels 50 are fed into a DSP block 52 which performs all channel processing (vocoder, code spreading/code division multiple access (CDMA), time multiplexing/time division multiple access (TDMA), equalization, etc.) and beamforming and/or spatial processing. This block 52 may be referred to as the "Common DSP Block". It is a collection of DSP processors, programmed for each specific task (channel and spatial processing). The output from this block 52, in either digital baseband (I&Q—in phase and quadrature) or digital IF, is converted to an optical carrier via a digital fiber optic (OF) converter 54. In one embodiment of the invention, this block 52 and the converter 54 can be located at the tower base (cell site) BTS, MSC, or CO (Central Office).

The fiber signals are then carried to the tower via a single cable or combination of multimode or singlemode fiber cables, indicated by reference numeral 22.

Figure 3:
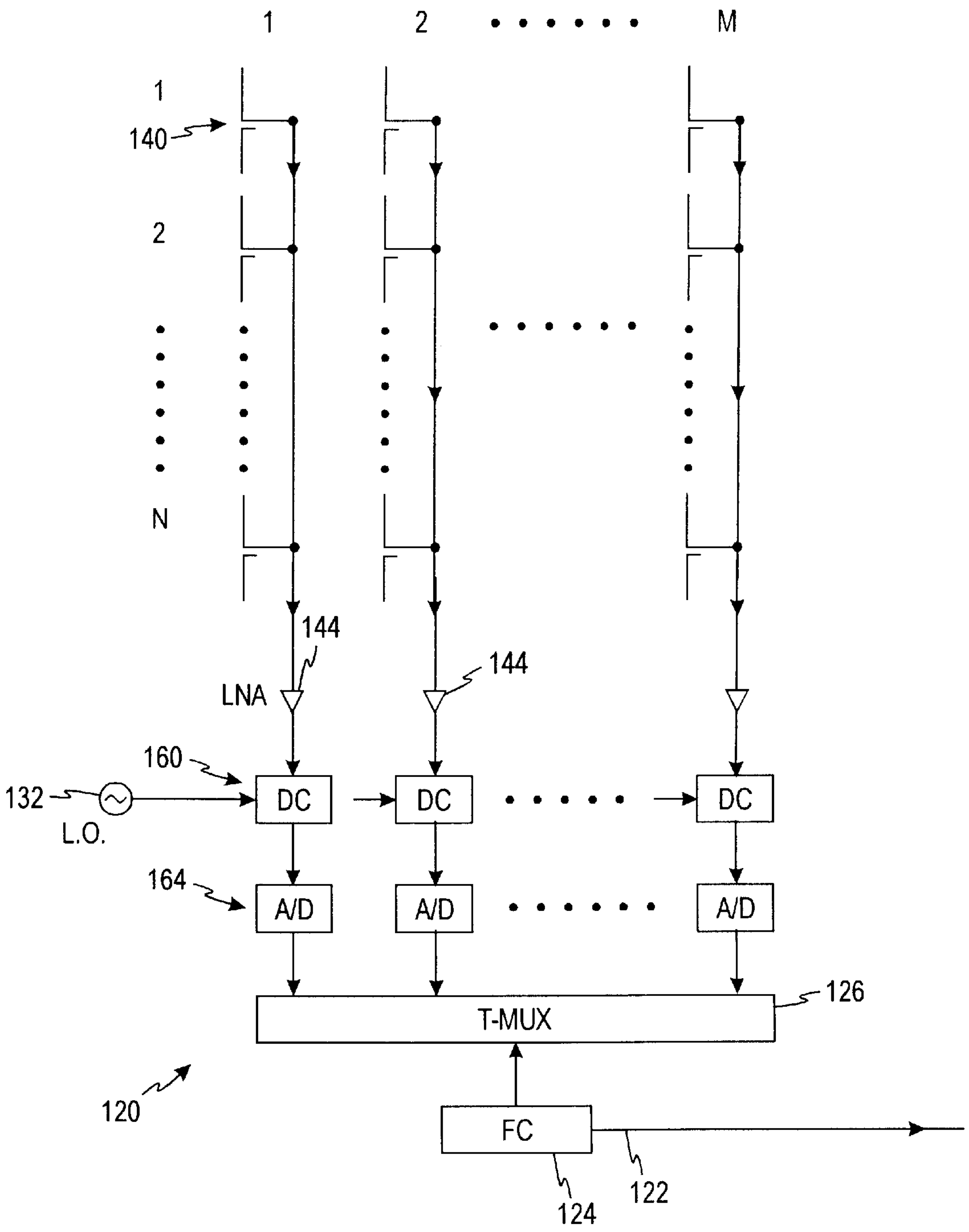
FIG. 3 is a simplified schematic diagram, partially in block form, of a receive only configuration, for a smart antenna/beamforming subsystem.

FIG. 3 shows a receive-only system configuration, for a smart antenna/beamforming subsystem 120. RF signals are received via an M×N array of antenna elements 140, here shown as a collection of patch/microstrip elements. Each column in the array is summed via a series corporate feed, which could alternatively be a parallel corporate feed. In this particular configuration, the summed signals are amplified, via a low noise amplifier (LNA) 144, after the corporate feed. After each signal is amplified, it is downconverted at a downconverter (DC) 160 to IF, and digitized by an analog to digital converter (ADC) 128. The digitized signals are then time division multiplexed by a T-MUX 126, into a single high speed digital signal, which is fed to a fiber converter (FC) 124, which translates/modulates the high speed digital signal onto an optical carrier 122. This carrier 122 may be a single, or multiple, fiber optic cables, for delivering signals to the BTS, MSC, or CO. Similar to the transmit mode (see FIG. 1), a common LO 132 is used to coherently translate all column/array signals from RF to IF. The systems of FIGS. 1 and 3 may be combined to form a transmit/receive system, which could in turn be combined with the ground-based components of FIG. 2 to define an antenna system architecture in accordance with one embodiment of the invention.

Figure 4:
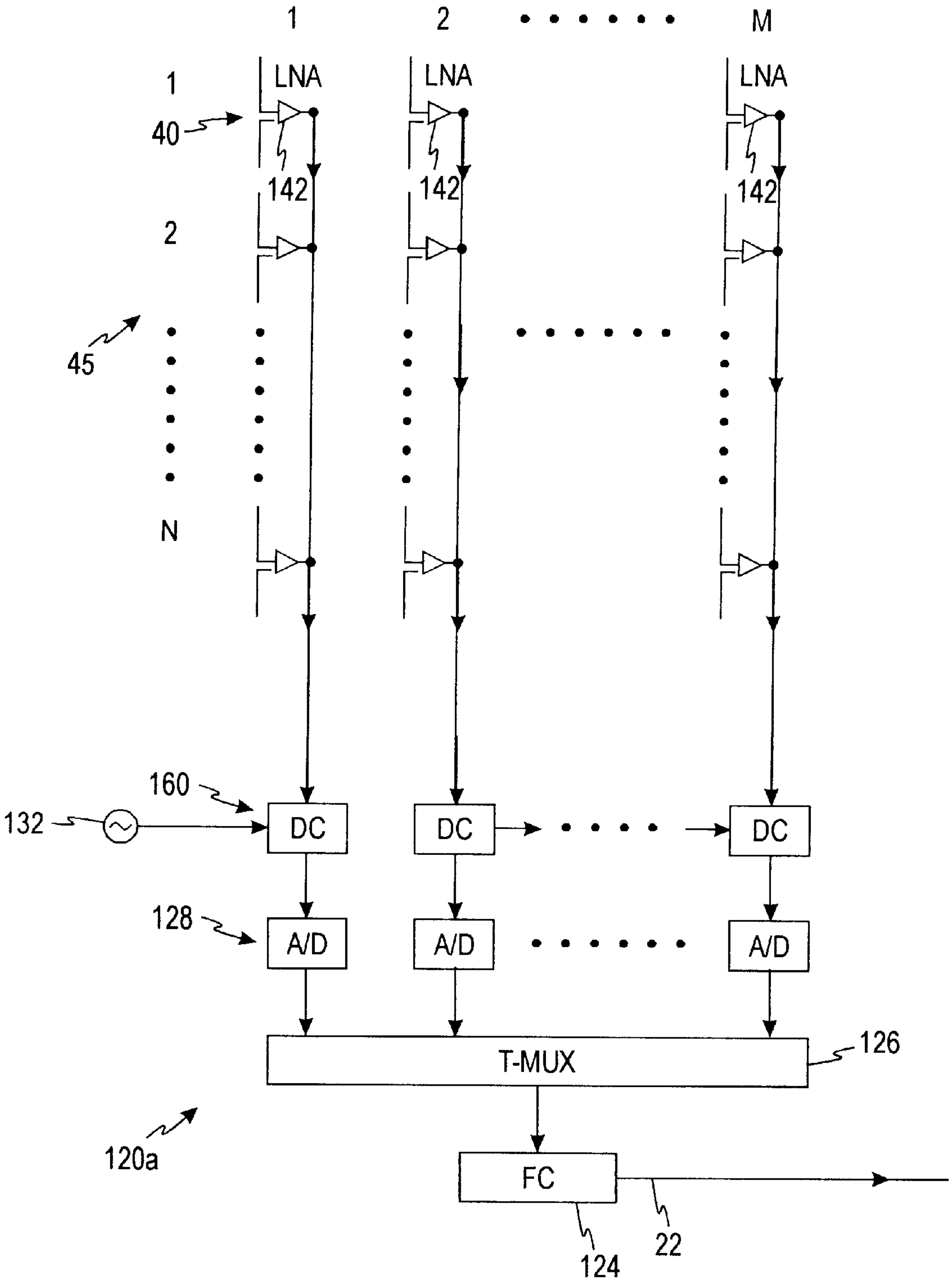
FIG. 4 shows the same basic configuration as FIG. 3, but with a low noise amplifier (LNA) circuit/component at each antenna element.

FIG. 4 shows the same basic architecture (a receive-only subsystem 120*a*) as FIG. 3, but with an LNA circuit/amplifier module 142 at each antenna element 140. Thus the signals are amplified prior to being summed via the corporate feeds. This configuration may be more expensive, in terms of the costs of the additional LNA components, but will achieve increased sensitivity (lower system noise figure) since the signals are amplified prior to any losses in the corporate feed circuits.

Figure 5:
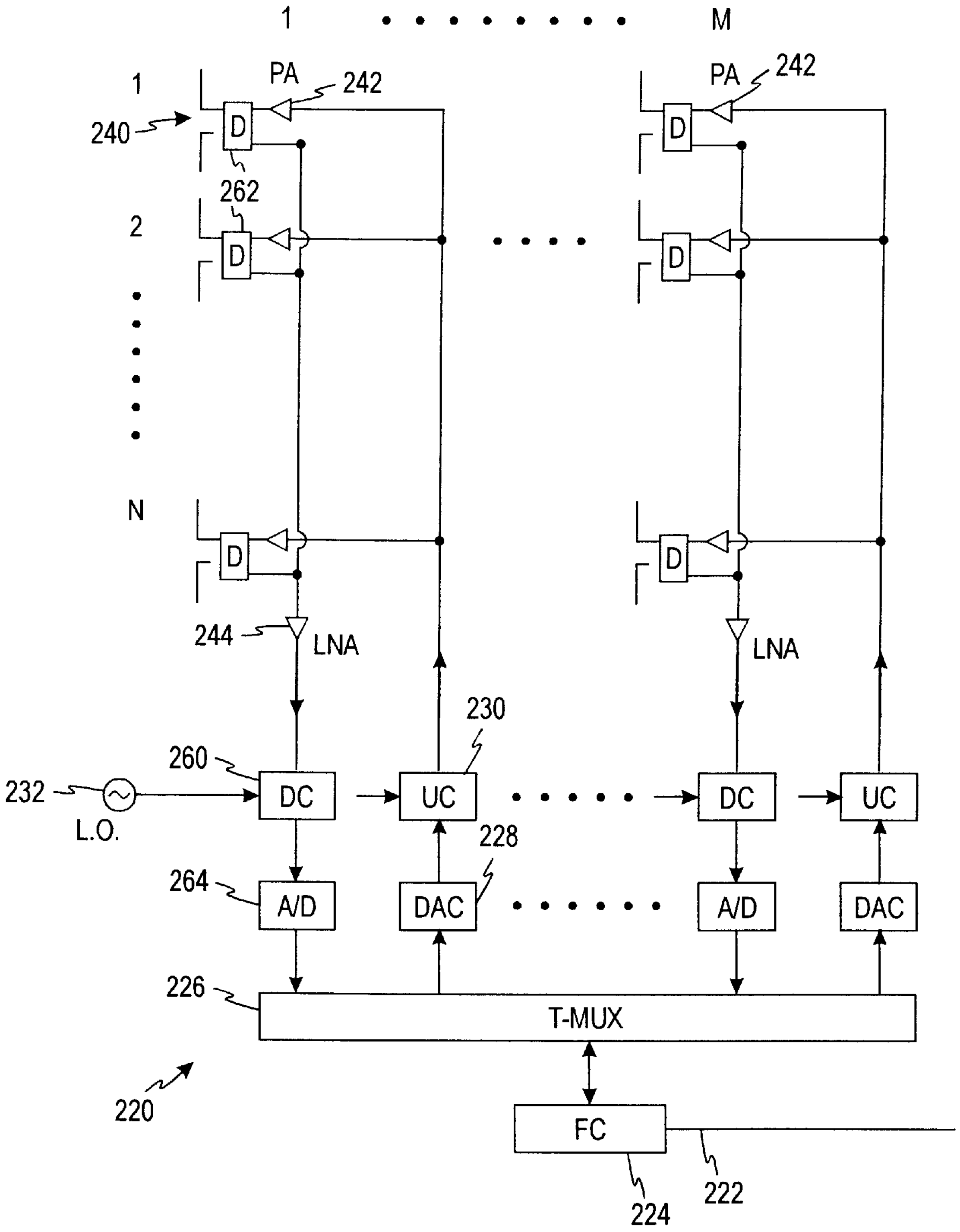
FIG. 5 is a simplified schematic diagram, partially in block form, of a first configuration for a transmit/receive smart antenna/beamforming subsystem.

FIG. 5 shows one embodiment of a transmit/receive smart antenna/beamforming subsystem 220. This system utilizes a single LNA 244 for each branch (i.e., column of the M×N array), similar to the receive-only configuration of FIG. 3. At each antenna element 240, a frequency diplexer (D) 262 is used to separate the transmit and receive power, on separate frequency bands. The receive power is summed, via a series corporate feed (could be parallel), and fed to an LNA 244 at the bottom of each branch (column, i.e., of the M×N array). The amplified RF signals are then downconverted to IF at downconverters (DC) 260 and digitized at A/D converters 264, and fed to the high speed T-MUX (time domain multiplexer) 226. Similarly, transmit mode signals (from the BTS, MSC, or CO) are converted, de-multiplexed, digitized, and upconverted from IF to RF at FC 224, T-MUX 226, DACs 228 and UCs 230. The converted signals are then distributed to the antenna elements, on each branch, via the corporate feed (series or parallel) and amplified (at each antenna element 240) by PAs 242. The amplified signals pass through the frequency diplexer (D) 262 to the antennas 240 to be radiated into space. The same LO source 232 can be used for both the upconversion and downconversion operations, for all of the branches.

The fiber optic cables 222 thus carry digital IF on an optical carrier in both directions. This can be accomplished on a single OF (fiber optic) cable via wavelength division multiplexing, or on multiple OF cables, one (or more) for each path.

Figure 6:
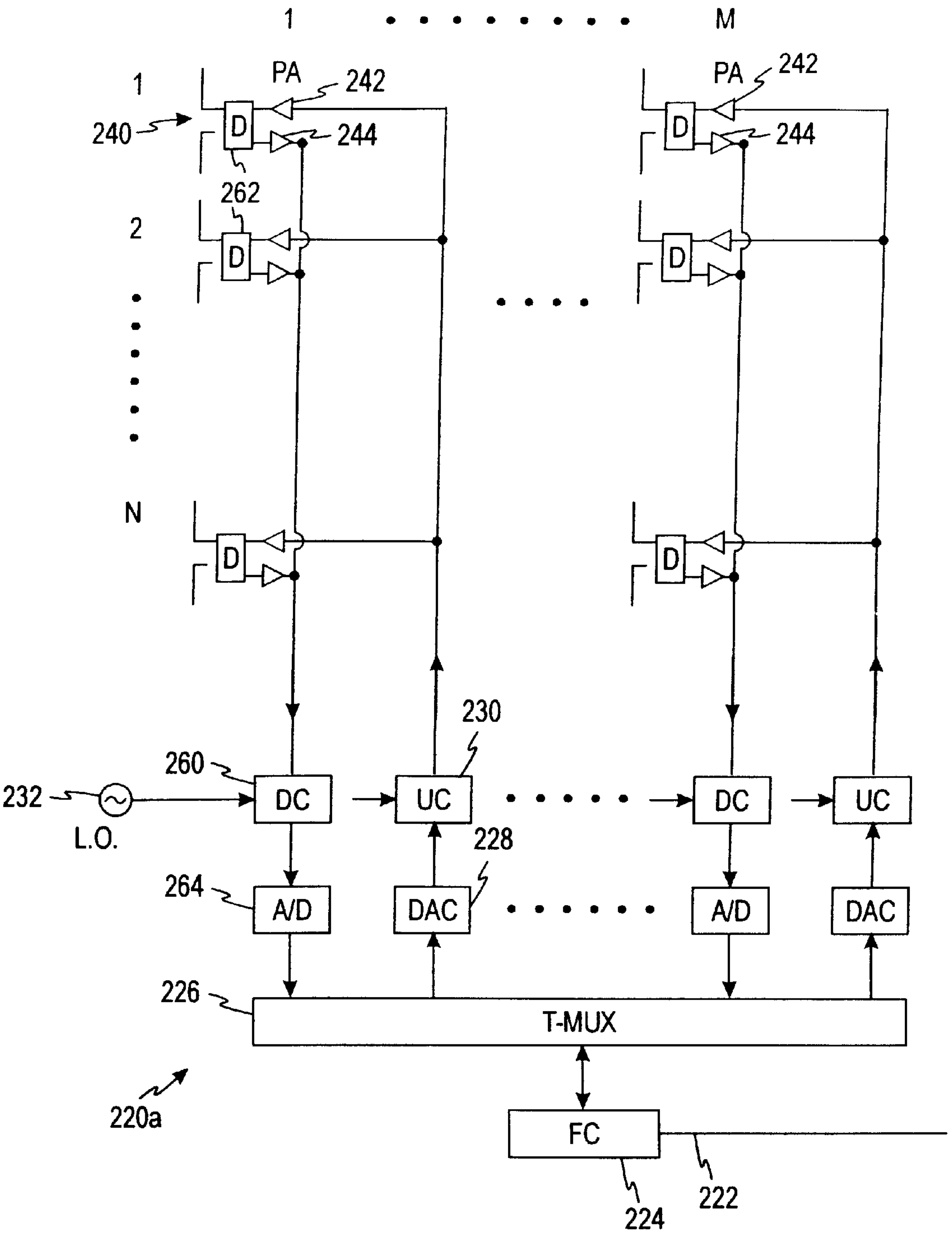
FIG. 6 shows a similar configuration to FIG. 5, except that the receive mode signals (uplink) are amplified, via an LNA, before summing in the corporate feed network.

FIG. 6 shows a similar architecture to FIG. 5 for a transmit/receive system 220*a*, except that the receive mode signals (uplink) are amplified by LNAs 244 at the antenna elements 240, before summing in the corporate feed network. This is similar to the receive-only configuration of FIG. 4.

Figure 7:
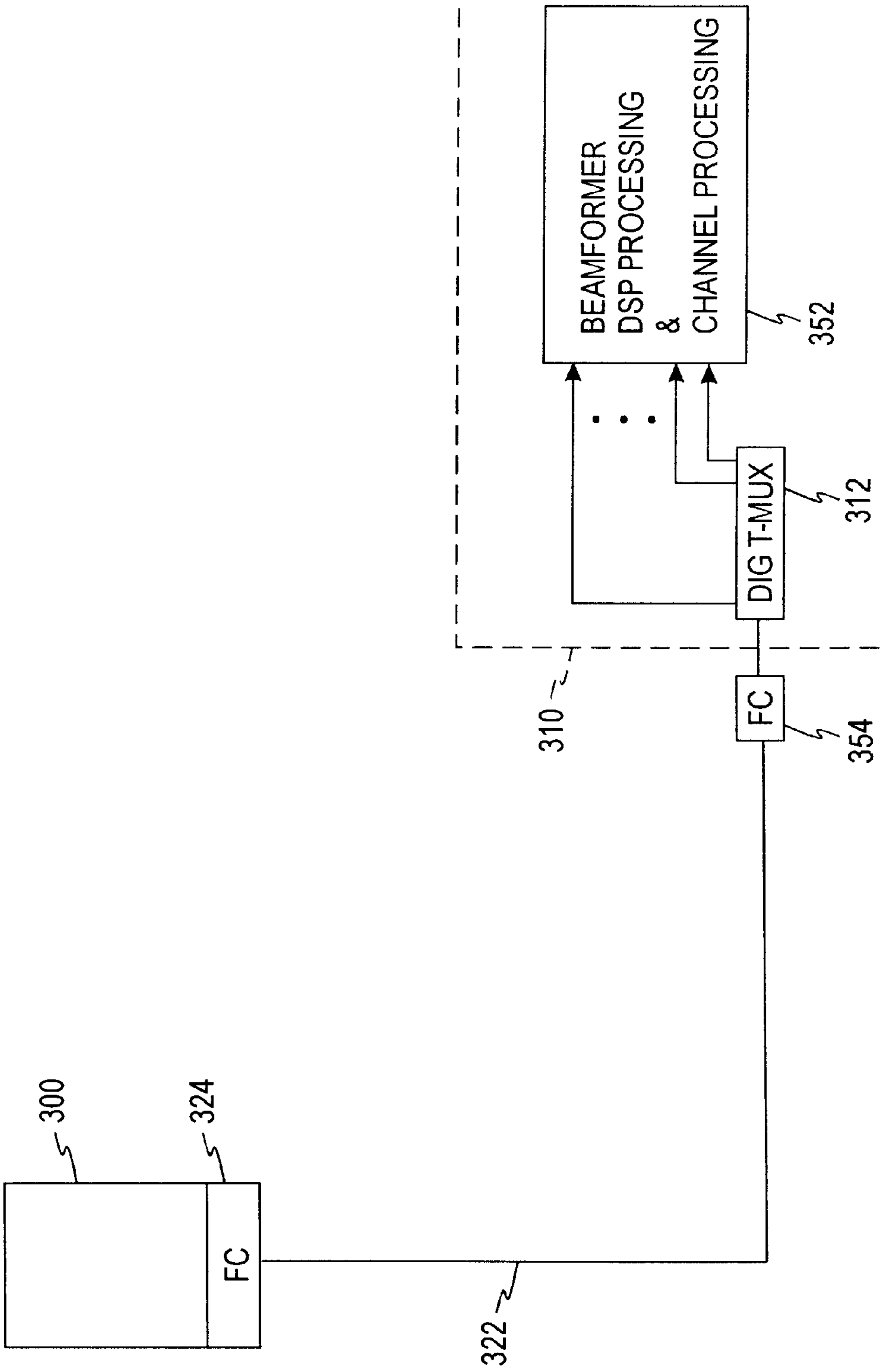
FIG. 7 shows a basic system architecture.

FIG. 7 shows a basic architecture for the tower-top beamformer subsystem, for all of the embodiments of FIGS. 1–6. A panel antenna system 300, with a fiber converter (FC) 324, is shown with fiber optic transmission line(s) or cable (s) 322. The subsystem 300 may include all of the components of any of the subsystems of FIGS. 1–6, up to the FC (fiber converter) 324. The advantage of this arrangement is that all of the RF functionality is performed at a single location, i.e. at the tower top. This minimizes the lengths of RF transmission lines throughout the system. For example, there is no need to transmit RF back to the base station (BTS), MSC or CO 310. This results in minimizing ohmic and power losses, as well as increasing the overall system performance (noise figure, etc.). This is also the part of the system that is most likely to remain static (i.e. not requiring performance-oriented changes as often).

The section of the beamforming system that will likely change, due to improved DSP availability and algorithms, software updates, etc. can be centralized in a single location 310 (e.g., BS/BTS, MSC, or CO). This section may include beamformer, digital signal processing (DSP) and channel processing components as indicated by reference numeral 352 in FIG. 7.

At the other end of the fiber cable 322 is a fiber converter (FC) 354 to convert to digital IF, and a digital multiplexer 312, which may be part of the base station 310. The above-described arrangement allows all the high cost "digital processing" segment of the beamformer to be placed in a central location, to facilitate algorithm and software upgrades, as well as hardware (DSP) changes.

Figure 8:
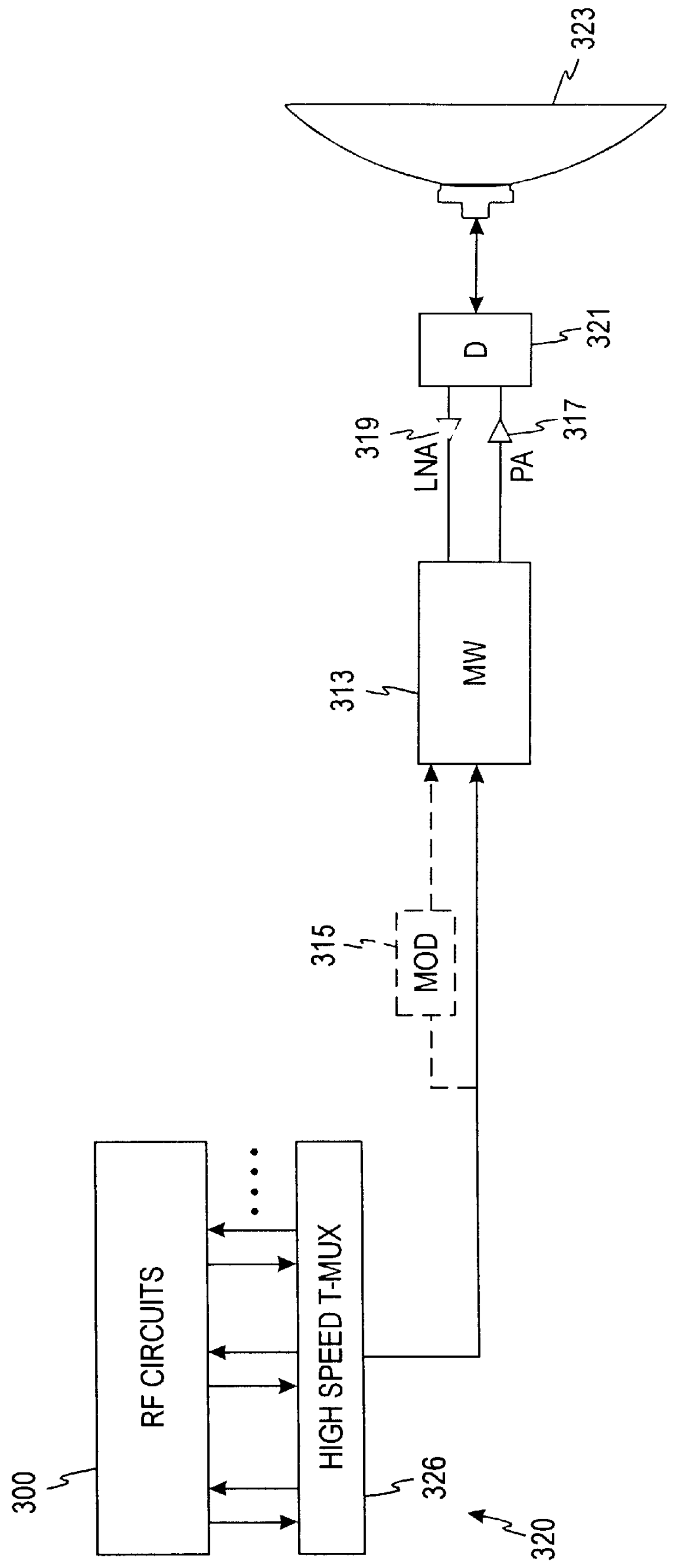
FIG. 8 shows a system architecture for a system using a microwave backhaul link.

FIG. 8 shows an architectural approach for microwave backhaul link to replace the fiber connection 22 (122, 222, 322). All of the prior embodiments described the high-speed backhaul link being performed using fiber optic cable. However, currently many cell sites use microwave (2–40 GHz range) links for the trunking/backhaul, and this may be substituted for the fiber link shown in the above-described embodiments without departing from the invention.

In FIG. 8, on the top left, is a block 300 denoted as "RF circuits". This encompasses the antenna elements, LNAs, PA's, corporate feed networks, RF upconverters and downconverters, as well as A/Ds and DACs shown in the above-described embodiments. The digital signal is then fed into a composite high speed digital T-MUX 326 (as shown in the previous embodiments). However, rather than feed the time division digitally multiplexed signals into a fiber converter, the signals are directly translated, at the tower top, by a microwave (MW) converter (transceiver) 313, and amplified through a PA (power amplifier) 317, fed through a microwave frequency diplexer (D) 321, to a radiating backhaul antenna 323. This backhaul antenna 323 is similar to a terrestrial microwave antenna, or LMDS (local multipoint distribution service) antenna system. Similarly received uplink microwave signals, from the antenna 323, are fed back through the frequency diplexer (D) 321, amplified via a microwave LNA 319, and downconverted to digital IF (high speed), back to the high speed T-MUX 326.

Optionally, the high speed digital multiplexed signals from the beamformer/smart antenna subsystem 320 could be fed to an intermediate modulator (MOD) 315 (shown in phantom line), that modulates the IF signals to a format more efficient for microwave transmission, and then fed to the microwave converter 313.

FIGS. 9–13 are respectively similar to FIGS. 1 and 3–6, however, FIGS. 9–13 show third generation PCS and UMTS (universal mobile telecommunications service) (3G) systems. Two standards, designated as CDMA-2000 and W-CDMA, are currently being developed for use as the worldwide roaming or mobile (cellularized) systems for voice and data transport. While architecturally very similar to the diagrams in FIGS. 1 and 3–6, FIGS. 9–13 differ in that they use a QPSK (quadrature phase shift keying) modulator and RF upconverter block, designated in FIGS. 9–13 as a 3G (third generation CDMA) modulator block 410 (510, 610). This block assumes digital baseband I & Q on the input (or output). Therefore, digital baseband (I&Q) signaling is embedded in the fiber optic signal, which is assumed to be time division multiplexed.

Figure 9:
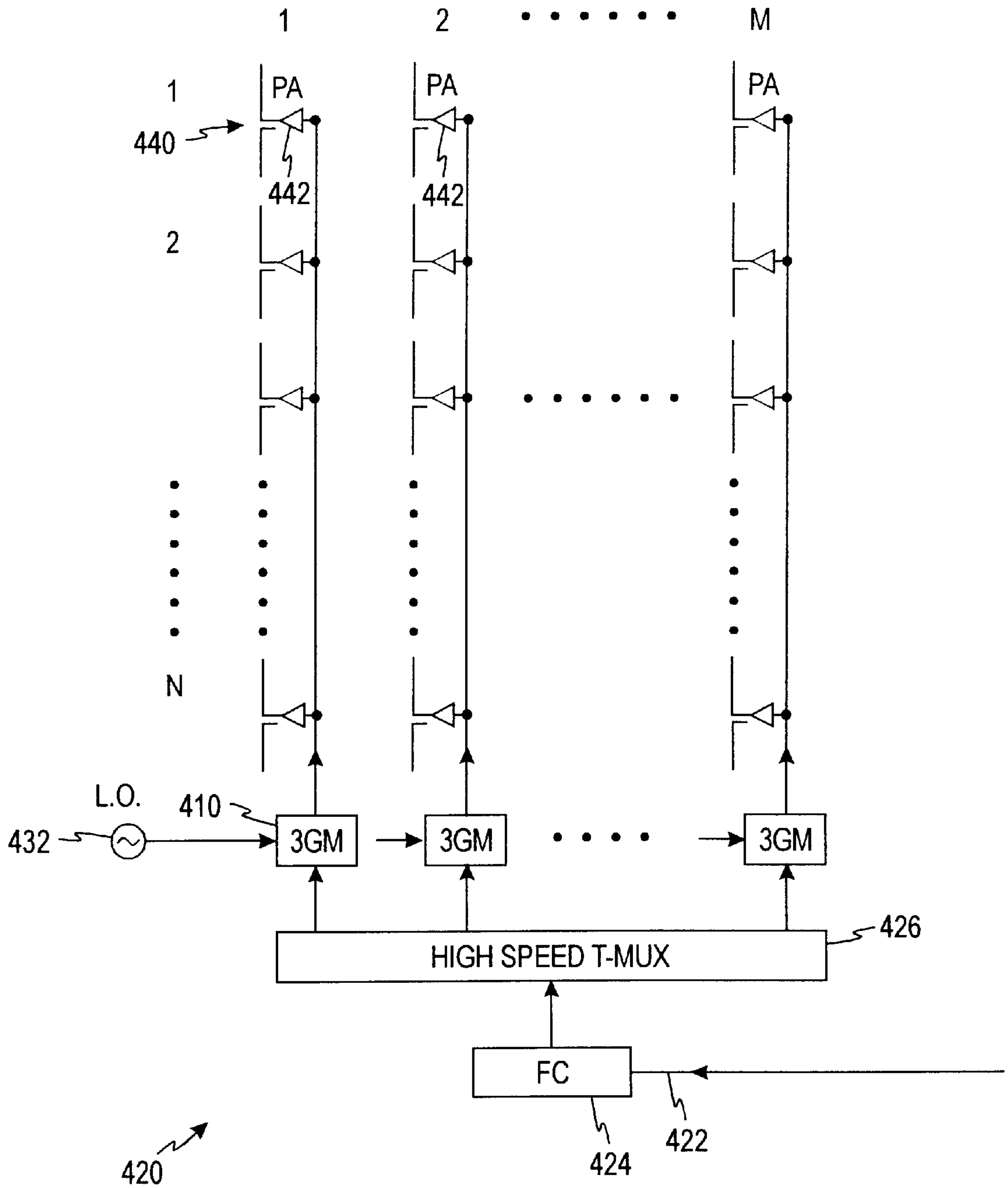
FIG. 9 is a simplified schematic diagram, partially in block form, of the tower top components for a "third generation" (3G) transmit mode antenna system; 15

FIG. 9 shows a 3G transmit mode smart antenna/beamformer subsystem 420. The digital multiplexed (baseband I & Q) signals, carried on a high speed stream, are converted from fiber to digital at FC 424 and de-multiplexed at T-MUX 426 into M lower speed streams. The 3G modulator block 410, on each branch, converts the signals from digital to analog, performs a QPSK modulation, spreads the carriers (via the appropriate CDMA spreading codes) and upconverts to RF. The rest of FIG. 9 is similar to FIG. 1. Also, all 3GM blocks 410 use the same local oscillator 432 to coherently upconvert to all branches.

Figure 10:
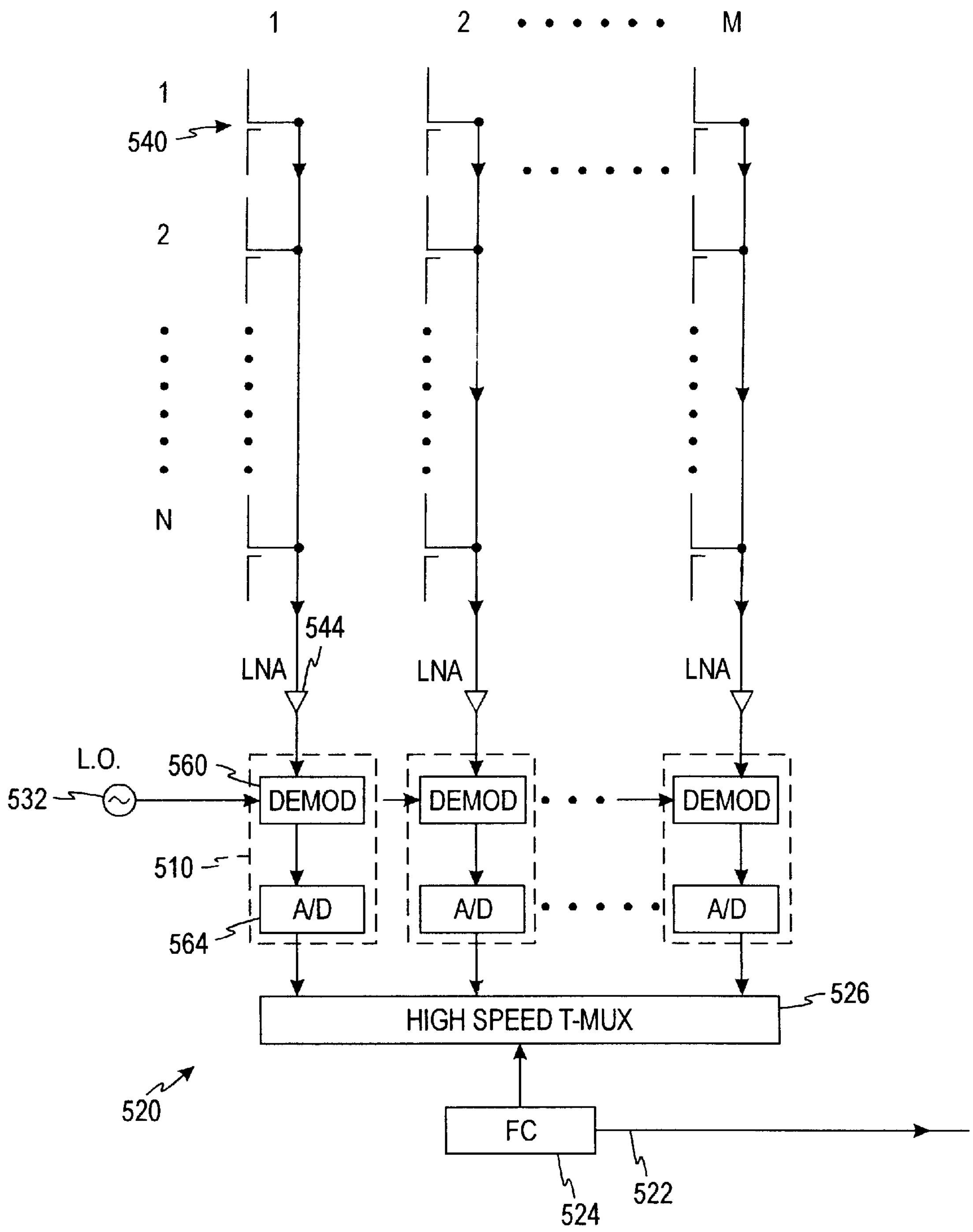
FIG. 10 is a simplified schematic diagram, partially in block form, of the tower top components for a "third generation" (3G) receive mode configuration with a single LNA at the output of the corporate feed for each branch.

FIG. 10 shows a receive mode configuration 520, with a single LNA 544 at the output of the corporate feed for each branch. A 3G modulator block 510 has been separated into two blocks, a "demodulator" (downconverter, CDMA code despreader, and QPSK demodulator) 560 and an A/D 564. The digital baseband (I & Q) outputs are then time division multiplexed at T-MUX 526, and fed to the digital to fiber converter (FC) 524, which sends the multiplexed digital baseband signals on a fiber carrier 522.

Figure 11:
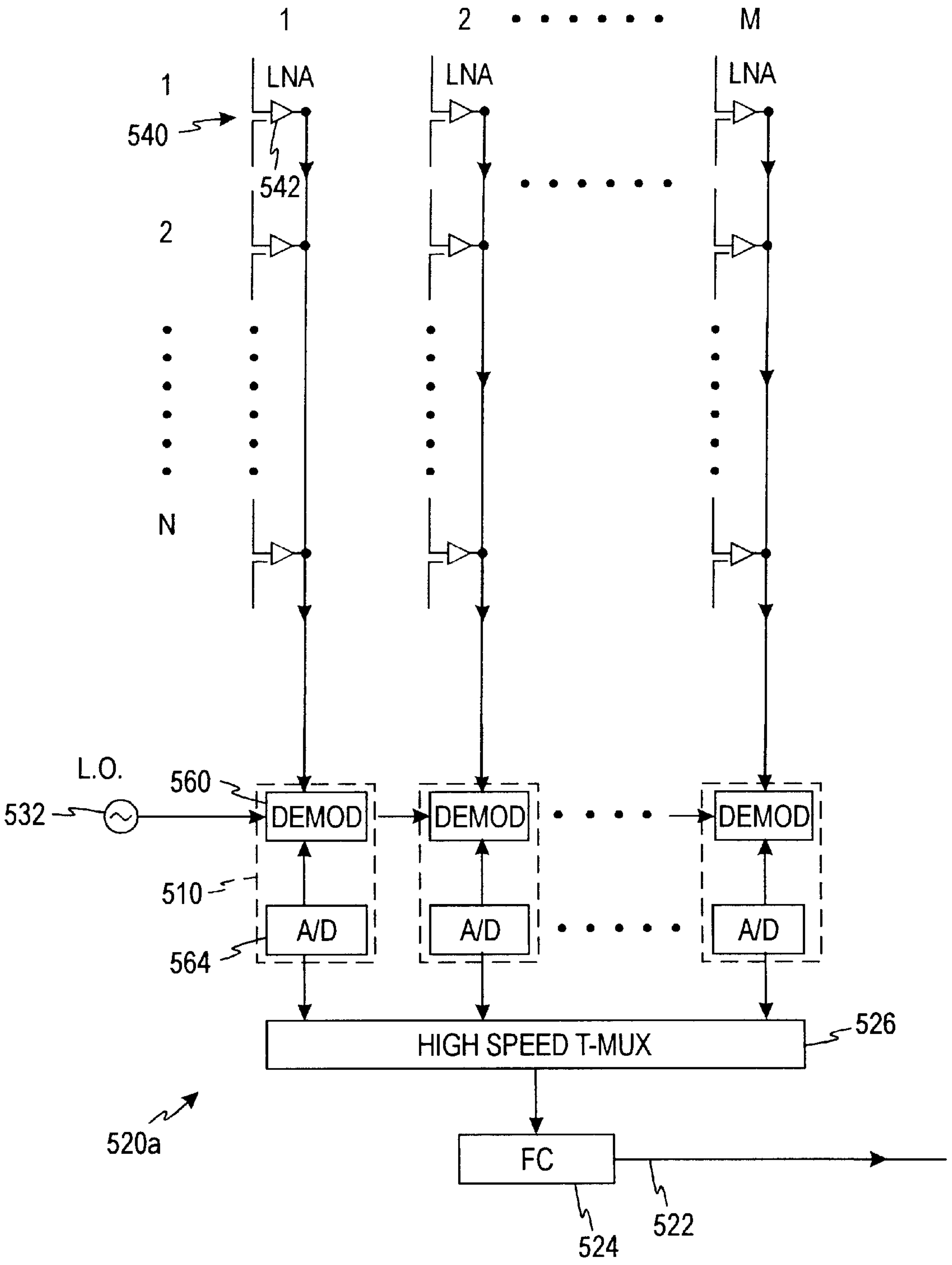
FIG. 11 is a simplified schematic diagram, partially in block form, of the tower top components for a "third generation" (3G) the receive mode configuration with an LNA on each antenna element, prior to the corporate feed network.

FIG. 11 shows a second receive mode configuration 520, with an LNA 544 at each antenna element 540, prior to the corporate feed network, on each branch, and is otherwise the same as FIG. 10.

Figure 12:
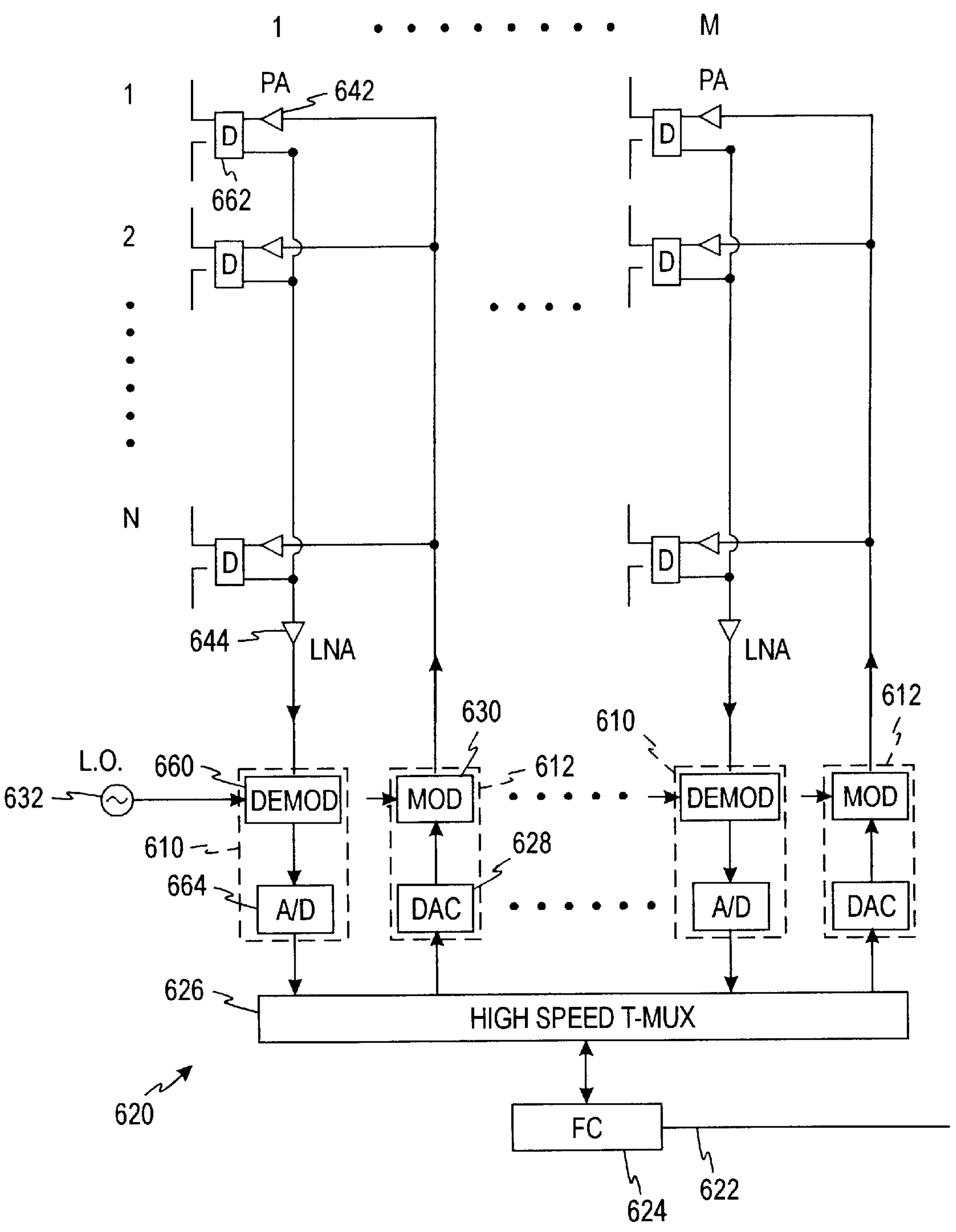
FIG. 12 is a simplified schematic diagram, partially in block form, of the tower top components for a "third generation" (3G) a transmit/receive mode configuration with a single LNA on each receive branch.
Figure 13:
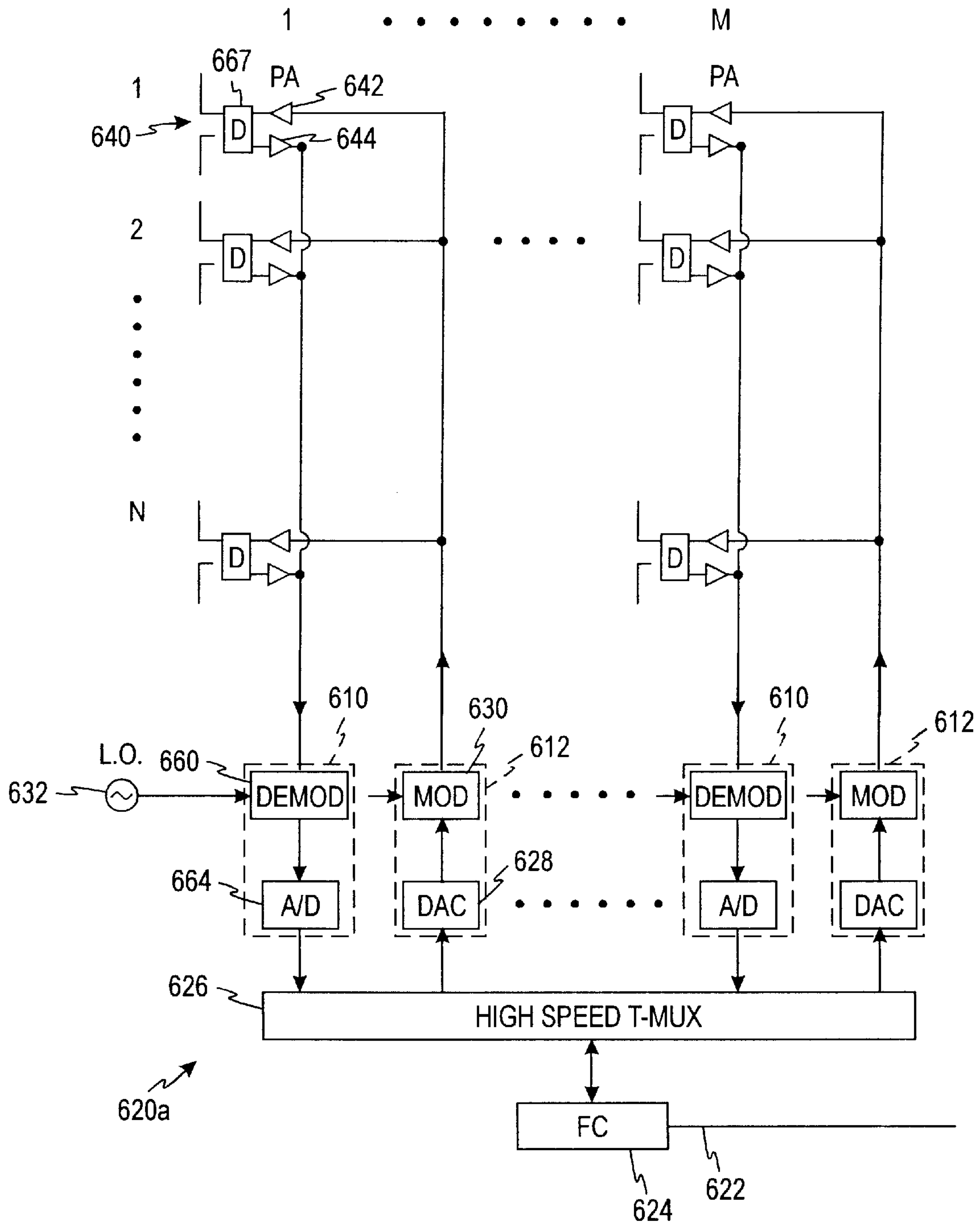
FIG. 13 is a simplified schematic diagram, partially in block form, of the tower top components for a "third generation" (3G) a transmit/receive mode configuration with an LNA on each element, prior to the corporate feed network.

FIGS. 12 and 13 shows two configurations 620, 620*a* for a transmit/receive 3G beamformer/smart antenna system, with a 3G modulator block 610, 612 on each path (2-Way) on each branch. FIG. 12 shows a configuration with a single LNA 644 on each receive branch. FIG. 13 shows a configuration with an LNA 644 at each antenna element prior to the corporate feed network. In FIGS. 12 and 13, components similar to those used in the above-described embodiments are designated by similar reference numerals with the prefix 6. Also in FIGS. 12 and 13, the 3G modulator block 610 includes the components of both the 3G modulator blocks 410 and 510 of FIGS. 9 and 10, as described above.

While the systems of FIGS. 9–13 illustrate a fiber carrier 422, 522, etc., each could alternatively use a microwave backhaul link of the type shown in FIG. 8.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An antenna system for a tower-top installation, comprising:

an antenna array comprising an array of M×N antenna elements;

a corporate feed for operatively interconnecting said antenna elements with a backhaul link for communicating with ground-based equipment; and radio frequency circuits proximate the antenna array for processing radio frequency communication signals between said antenna array at a tower top and a backhaul link, said radio frequency circuits configured for interfacing with backhaul signals in at least one of digital IF and digital baseband formats at the backhaul link and including:

multiplexing circuitry for multiplexing between the backhaul link and multiple antenna elements of the array;

analog/digital conversion circuitry for converting between analog and digital representations of the backhaul signals;

frequency conversion circuitry for converting between radio frequency communication signals and intermediate frequency signals;

the radio frequency circuits configured for providing the necessary processing of radio frequency communication signals between said antenna array and said backhaul link for transceiving communication signals with said ground-based equipment in one of the digital baseband and digital IF formats on the backhaul link.

2. The system of claim 1 wherein said analog/digital conversion circuitry includes a digital-to-analog converter for converting digital signals from said backhaul link to analog intermediate frequency signals.

3. The system of claim 2 wherein said radio frequency circuits include at least one upconverter for upconverting the analog intermediate frequency signals to radio frequency signals.

4. The system of claims 1 and further including a power amplifier coupled with each antenna element.

5. The system of claim 4 wherein said array comprises M columns of N antenna elements wherein both M and N are greater than 1, wherein said analog/digital conversion circuitry comprise a total of M digital to analog converters and the frequency conversion circuitry includes M upconverters, one for each column, and further the multiplexing circuitry including a time domain multiplexer coupled between the backhaul link and said digital to analog converters for de-multiplexing a digital signal from said backhaul link to said digital to analog converters.

6. The system of claim 1 wherein said radio frequency circuits comprise at least one downconverter coupled to the antenna elements for downconverting radio frequency signals to intermediate frequency signals.

7. The system of claim 6 wherein said radio frequency circuits include at least one analog-to-digital converter circuit coupled with said downconverter circuit for converting said intermediate frequency signals to digital intermediate frequency signals.

8. The system of claim 7 wherein said array comprises M columns and N antenna elements, wherein both M and N are greater than 1, wherein said analog-to-digital converter and said downconverter comprise a total of M analog-to-digital converters and M downconverters, one for each column, and further including a time domain multiplexer coupled between the backhaul link and said analog-to-digital converters for multiplexing M digital intermediate frequency signals from the respective analog-to-digital converter circuits into a high speed digital signal for said backhaul link.

9. The system of claim 6 and further including at least one low noise amplifier coupled between the antennas of said array and at least one downconverter.

10. The system of claim 8 and further including a low noise amplifier coupled between each antenna element of said array and a corresponding downconverter.

11. The system of claims 1 wherein said radio frequency circuits comprise at least one downconverter coupled to the antenna elements for downconverting radio frequency signals to intermediate frequency signals.

12. The system of claim 11 wherein said radio frequency circuits include at least one analog to digital converter circuit coupled with said downconverter circuit for converting said intermediate frequency signals to digital intermediate frequency signals.

13. The system of claim 12 wherein said array comprises M columns of N antenna elements, wherein both M and N are greater than 1, wherein said analog-to-digital converter and said downconverter comprise a total of M analog-to-digital converters and M downconverters, one for each column, and further including a time domain multiplexer coupled between the backhaul link and said analog-to-digital converters for multiplexing M digital intermediate frequency signals from the respective analog-to-digital converters into a digital signal for said backhaul link.

14. The system of claim 13 and further including at least one low noise amplifier coupled between the antennas of said array and a corresponding downconverter.

15. The system of claim 14 wherein said at least one low noise amplifier comprises a low noise amplifier coupled with each antenna element of said array.

16. The system of claim 1 and further including a frequency diplexer coupled with each antenna element.

17. The system of claim 1 wherein said backhaul link comprises a fiber optic cable.

18. The system of claim 1 wherein said backhaul link comprises a microwave link.

19. The system of claim 1 in combination with a ground-based facility coupled through said backhaul link to said tower-top installation, and wherein digital signal processing, including channel and spatial processing associated with the transmission and/or reception of radio frequency signals at said tower-top installation, is carried out in said ground-based facility.

20. The system of claim 1 wherein said analog/digital conversion circuitry and frequency conversion circuitry are third generation CDMA circuits.

21. The system of claim 20 wherein said third generation CDMA circuits include a downconverter, a CDMA code despreader and QPSK demodulator circuits.

22. The system of claim 20 wherein said third generation CDMA circuits include digital to analog converter circuits, QPSK modulation circuits and CDMA code spreading circuits.

23. A method of constructing an antenna system for a tower-top installation, comprising:

arranging a plurality of antenna elements in an M×N array of antenna elements;

operatively interconnecting said antenna elements with a backhaul link for communicating with ground-based equipment and backhaul signals being in at least one of digital IF and digital baseband formats for the backhaul link;

processing radio frequency signals between said antenna array and a backhaul link; and with radio frequency circuits proximate the antenna array including analog/digital conversion circuitry and frequency conversion circuitry, providing the necessary processing of radio frequency communication signals between said antenna array and said backhaul link, in said tower-top installation, for transceiving communication signals with said ground-based equipment in one of the digital baseband and digital IF formats on the backhaul link.

24. The method of claim 23 wherein said processing includes converting digital signals from said backhaul link to analog intermediate frequency signals.

25. The method of claim 24 wherein said processing includes upconverting the analog intermediate frequency signals to radio frequency signals.

26. The method of claim 25 and further including amplifying the signals following said upconverting.

27. The method of claim 23 wherein said arranging comprises arranging said antenna elements in M columns of N antenna elements, wherein both M and N are greater than 1, and further including time domain de-multiplexing a digital signal from said backhaul link.

28. The method of claim 23 wherein said processing includes downconverting radio frequency signals from said antenna elements to intermediate frequency signals.

29. The method of claim 28 wherein said processing includes converting said intermediate frequency signals to digital intermediate frequency signals.

30. The method of claim 23 wherein said arranging comprises arranging said antenna elements as M columns of N antenna elements, wherein both M and N are greater than 1, and further including time domain multiplexing M digital intermediate frequency signals into a digital signal for said backhaul link.

31. The method of claim 28 and further including amplifying the signal before said downconverting.

32. The method of claim 23 wherein said processing includes downconverting radio frequency signals from said antenna elements to intermediate frequency signals.

33. The method of claim 32 wherein said processing includes converting said intermediate frequency signals to digital intermediate frequency signals.

34. The method of claim 33 wherein said arranging comprises arranging said antenna elements as M columns of N antenna elements, wherein both M and N are greater than 1, and further including time domain multiplexing M digital intermediate frequency signals into a digital signal for said backhaul link.

35. The method of claim 32 and further including amplifying the signal before said downconverting.

36. The method of claim 23, in combination with performing digital signal processing, including channel and spatial processing associated with the transmission and/or reception of radio frequency signals at said tower-top installation, at a ground-based facility.

37. The method of claim 25 wherein said digital to analog conversion and said upconversion utilize third generation CDMA techniques.

38. The method of claim 29 wherein said downconversion and said analog-to-digital conversion utilize third generation CDMA techniques.

39. The method of claim 38 wherein said third generation CDMA techniques include a downconverting, CDMA code despreading and QPSK demodulating.

40. The method of claim 37 wherein said third generation CDMA techniques include digital-to-analog converting, QPSK modulating and CDMA code spreading.

41. The method of claim 25 wherein said upconverting utilizes third generation CDMA techniques.

42. The method of claim 32 wherein said down converting utilizes third generation CDMA techniques.

* * * * *